United States Patent Office 3,692,695
Patented Sept. 19, 1972

3,692,695
FLUORIDED COMPOSITE ALUMINA CATALYSTS
Robert M. Suggitt and John H. Estes, Wappingers Falls, and Stanley Kravitz, Wiccopee, N.Y., assignors to Texaco Inc., New York, N.Y.
No Drawing. Filed June 25, 1970, Ser. No. 49,897
Int. Cl. B01j *11/78*
U.S. Cl. 252—439
14 Claims

ABSTRACT OF THE DISCLOSURE

A method for preparing a hydrocarbon conversion catalyst by providing a composite composed of alumina having associated therewith a Group VI–B, VII–B or VIII metal or compound and contacting the composite with an activator system comprising hydrogen and sulfur hexafluoride. The catalysts so prepared are useful in such hydrocarbon conversion processes as isomerization, hydrocracking, reforming, alkylation, disproportionation, polymerization and hydrogenation.

BACKGROUND OF THE INVENTION

This invention relates to the preparation of fluorine containing catalysts and to their use in low temperature hydrocarbon conversion processes. In one of its specific aspects, this invention relates to a method of preparing a catalyst comprising a member of Group VI–B, VII–B or VIII of the Periodic Table, alumina and fluorine which is suitable for the conversion of hydrocarbons.

Fluorided catalysts are of interest for various processes including isomerization, reforming, alkylation, hydrogenation, disproportionation, cracking, polymerization and hydrocracking. Heretofore, activation of catalyst bases or composites by fluoriding was undertaken employing aqueous hydrogen fluoride or vaporized boron or ammonium fluorides. Such fluoriding techniques, however, by virtue of the fluoriding materials employed introduced various problems not the least of which included health, handling and equipment corrosion. In some instances unwanted surface deposits resulted from the treatment which interfered with the catalyst's ability to function. Moreover, such fluoriding techniques did not lend themselves to the replacement of fluorine lost during high temperature regeneration. Recently, other fluoriding compounds have been suggested such as carbon tetrafluoride and sulfur tetrafluoride. However, these materials in addition to their costliness present physiological difficulties.

It is therefore an object of this invention to provide a method for catalytically activating a composite material employing as a component of the activator system a fluoriding agent that introduces no equipment corrosion problems.

Another object of this invention is to provide a method for fluoriding catalyst with an agent that is physiologically inert.

Yet another object of this invention is to provide a method for fluoriding catalysts with a fluoriding system employing as fluoriding agent a material heretofore considered inert.

Still another object of this invention is to provide a hydrocarbon conversion process undertaken in the presence of a catalyst prepared or regenerated in situ under non-corrosive conditions in a hydrocarbon conversion reactor.

Other objects and advantages will become apparent from a reading of the following detailed description and examples.

SUMMARY OF THE INVENTION

Broadly, this invention contemplates a method of preparing a catalyst comprising a hydrogenating component, alumina and from about 0.5 to 15.0 weight percent fluorine which comprises contacting alumina having associated therewith a hydrogenating component selected from the group consisting of metals of Groups VI–B, VII–B and VIII of the Periodic Table, their compounds and mixtures thereof with a combination of hydrogen and sulfur hexafluoride at a temperature of from about 200 to 1200° F.

According to our invention, catalytically active fluoride catalysts can be prepared employing sulfur hexafluoride, a compound heretofore considered chemically inert. It has been found that this compound is rendered chemically reactive in the presence of a hydrogenating component comprising the metals and compounds of Groups VI–B, VII–B and VIII and hydrogen such that an alumina composite can be activated and provided with a chemically combined fluorine content of from about 0.5 to 15.0, preferably 0.5 to 6.0 weight percent based on the catalyst.

The highly active hydrocarbon conversion catalysts contemplated herein are prepared from an alumina composite activated with a combination of hydrogen and sulfur hexafluoride. As mentioned above, the alumina has associated therewith as a component of the composite a member selected from the group of metals of Groups VI–B, VII–B and VIII of the Periodic Table exemplified by chromium, molybdenum, tungsten, rhenium, cobalt, nickel, platinum, palladium, ruthenium and rhodium. Combinations of metals are also contemplated such as platinum-rhenium, nickel-tungsten and cobalt-molybdenum. The member may be present on the catalyst as metal or as a compound such as the oxide, sulfide or salt such as the sulfate. Preferably we employ a member having hydrogenating activity such as the metals of Group VIII and we particularly prefer platinum and palladium. In general, the catalyst may contain a member of Groups VI–B, VII–B or VIII in amounts of from 0.01 to 30 weight percent calculated as weight of metal. When Group VIII members such as platinum, palladium, rhodium and ruthenium are employed as composite components we preferably employ from 0.1 to 2.0 weight percent. Combinations of metals such as nickel and tungsten are employed in greater amounts as for example 20 to 30 weight percent.

Aluminas in various forms may be used in this invention and particularly those aluminas having replaceable surface hydroxyl groups and surface areas of 50 to 800 square meters per gram using the BET method. Included within our definition of alumina, we mention for example eta-alumina, gamma-alumina, silica-stabilized alumina, i.e., aluminas containing approximately 5 weight percent $SiO_2$, thoria-alumina, zirconia-alumina, titania-alumina and chromia-alumina. Also contemplated are silica-aluminas having surface areas of from 100 to 600 square meters per gram and aluminosilicates having surface areas of from 600 to 800 square meters per gram. Preferably we employ aluminas having surface areas of from 50 to 400 square meters per gram and particularly eta- and gamma-alumina. Suitable composites contemplated for contacting with our fluoriding system include commercially available materials including platinum-alumina and platinum-rhenium-alumina reforming catalysts, chrome-alumina dehydrogenation catalysts and nickel-tungsten-alumina, nickel-tungsten-silica-alumina hydrogenation catalysts. The composites are prepared by techniques well known to the art. Illustratively, a metal, such as platinum, is provided to the composite by impregnating active alumina with an aqueous solution of chloroplatinic acid and ethylene diamine followed by drying and calcining at about 1050° F. for 2 hours thereby providing a platinized alumina composite. Where palladium is contemplated, it may similarly be introduced by providing a palladium tetramine complex as by dissolving palladium chloride in hydrochloric acid, diluting with water and concentrated ammonium hydroxide followed by heating at 140° F. with stirring for about 30 minutes until the precipitate originally formed is dissolved. The resulting solution is cooled and added to the alumina and after thorough mixing the alumina is dried at about 300° F. and thereafter calcined at elevated temperatures of from 800 to 1200° F. for periods of at least 2 hours. Nickel oxide on alumina can be prepared by adding an aqueous solution of nickel nitrate to alumina at temperatures of from 80 to 200° F. and calcining the dried composite at 800° F. In a similar manner, Group VI-B and VII-B members are provided to the composite by impregnation with soluble salts of these metals, followed by calcination at 600 to 1200° F. for several hours.

In accordance with our invention, a composite as hereinabove defined is contacted with a combination of hydrogen and sulfur hexafluoride to introduce to the final catalyst about 0.5 to 15.0 weight percent chemically combined fluoride. Fluoriding in accordance with this invention enhances the acidity of the treated composite thereby promoting the catalyst's activity and improving its selectivity. Moreover, fluoriding provides the catalyst with activity at lower temperatures where the unfluorided composite would be inactive.

The mole ratio of hydrogen to fluoride compound during the contacting stage can vary from 0.1 to 100 moles of hydrogen per mole of fluoride compound and preferably within the range of 2 to 10 moles of hydrogen per mole of fluoride compound. Mole ratios of hydrogen less than 0.1:1 are undesirable because there is inefficient utilization of the fluoride compound and ratios above 100:1 are unnecessary because this greatly exceeds the optimum requirements of hydrogen consumption. The activating combination of hydrogen and sulfur hexafluoride may be introduced to the composite separately or as mixed gaseous streams and the gaseously activator components are permitted to flow through and over the composite. During contacting, the composite is generally maintained at a temperature of from 200 to 1200° F. and preferably at a temperature of from about 600 to 900° F. Depending on the activating temperature employed and the weight percent fluorine to be introduced to the composite, contact times ranging from one-half to twenty-four hours are employed. In view of the non-corrosive nature of sulfur hexafluoride, the catalyst can be prepared in situ in a hydrocarbon conversion reactor by passing a stream of hydrogen and the fluoride compound to the vessel directly containing the composite. The effluent from the reactor during activation contains hydrogen sulfide, water and unreacted components.

As mentioned above, the composite is contacted with a combination of hydrogen and sulfur hexafluoride. In the absence of the aforementioned Group VI-B, VII-B and VIII members as a component of the composite the fluoride compound is chemically inactive, particularly at temperatures of 900° F. and below, and the alumina is merely provided with absorbed sulfur hexafluoride and not chemically combined fluoride. Merely absorbing the compound onto the composite does not provide or promote activity nor improve selectivity. Unexpectedly, composites of alumina associated with a Group VI-B, VII-B or VIII metal as described above when contacted with a combination of hydrogen and sulfur hexafluoride in some manner unknown to applicants permits reaction between the heretofore considered inert fluoride compound and the composite such that chemically combined fluorine is introduced to the composite thereby providing the contemplated catalytically active material. Contacting as set out above is broadly undertaken at a temperature of at least 200 and up to 1200° F. Preferably, initial contacting of the composite, hydrogen and fluoride compound is conducted at temperatures of at least 450° F. thereby initiating rapid fluoriding of the composite. Upon reaching a fluoride content of about 0.5 weight percent, subsequent contacting temperatures as low as 200° F. can be employed. However, at the lower temperatures the reaction is slow and results in inefficient use of fluoride compound. Initial or subsequent contact temperatures below 200° F. are generally insufficient to provide adequate reaction rates or highly active catalysts useful commercial size operations in that fluoride levels of less than 0.5 weight percent result. In our highly preferred embodiment all contacting is conducted at temperatures of from about 600 to 900° F.

As contemplated herein, the inventive concept includes both initial activation and subsequent regeneration of the fluorided catalysts. It will be appreciated that during the course of hydrocarbon conversion, feedstocks employed may in some instances contain materials such as combined nitrogen in amounts exceeding 30 p.p.m. or such other materials as sulfur or carbonaceous deposits which in the course of operation cause the catalyst to become deactivated. These deactivating materials are removed from the catalyst by a hydrogen strip or a controlled oxidation. The catalyst surface is then exposed to a regenerating procedure by contacting with the combination of hydrogen and sulfur hexafluoride in the manner described above.

The catalyst prepared by our invention can be produced in pellet, granular, bead or pulverulent form to facilitate its use in fixed beds, moving beds or fluidized solid beds as is well known in the art. During the course of catalyst activation or regeneration, the effluent from the hydrocarbon conversion reactor consists largely of hydrogen sulfide, water, hydrogen and unconverted sulfur hexafluoride. Any unconverted fluoride compound and excess hydrogen may be recycled.

The catalyst prepared herein is highly active for hydrocarbon conversion at relatively low temperatures or from 200 to 1000° F. and finds application in a broad spectrum of conversion processes including hydrocracking, selective hydrocracking, hydroisomerization, disproportionation, alkylation, polymerization, reforming and hydrogenation. In general, the hydrocarbon feed-stocks contain less than 30 p.p.m. nitrogen and are converted in the presence of our catalyst at temperatures recited above.

Catalysts prepared according to our invention are admirably suited to convert a wide range of hydrocarbon materials. Illustratively, fluorided platinized aluminas are highly active for hydrocracking and hydroisomerizing such charge materials as waxes, slack wax and middle distillate oils at temperatures of 550 to 800° F., at pressures of 300 to 750 pounds per square inch gauge, liquid hourly space velocities of 1 to 20 and in the presence of hydrogen. In general, catalysts containing lower fluorine contents require the higher conversion temperatures for equivalent rates of reaction. Selectively for isomerization of normal $C_4$ to $C_6$ paraffins is improved at the lower temperatures. Aromatics can be hydrogenated and lubricating oil fractions can be modified to improve viscosity index and pour point. Fluorided aluminas having metal compounds such as the oxides associated therewith, exemplified by chromia and molybdena fluoride aluminas, show substantial activity for disproportionation of aromatics as for example the conversion of toluene to benzene and xylene at 750 to 1000° F. The catalysts are active for alkylation of aromatics and aliphatics and polymerization of olefins at temperatures of 200 to 400° F. and pressures of 300 to 800 p.s.i.g. The fluorided catalysts are active for hydrocarbon conversions at considerably lower temperatures than the non-fluorided composite. For example, fluorided platinized alumina permits isomerization of $C_4$ to $C_6$ n-paraffins at the 600° F. range whereas the non-fluorided composite is inactive at temperatures below 800° F.

In order to more fully illustrate the nature of our invention and manner of practicing the same, the following examples are presented. In these examples, the best mode contemplated by us for carrying out our invention is set forth.

Example I 380 cc. of gamma-alumina were calcined at 800° F. in a stream of dried nitrogen. After calcination, the temperature was lowered to 600° F. and 25 liters per hour of sulfur hexafluoride and 190 liters per hour of hydrogen were introduced to the bed of gamma-alumina. Analysis of the effluent stream failed to detect hydrogen sulfide. After increasing the temperature to 800° F., the effluent stream remained free of detectable hydrogen sulfide, thereby showing the inability of gamma-alumina alone to react with the fluoride compound at these temperatures.

Example II 400 cc. of commercially available 0.47 wt. percent platinum on eta-alumina were calcined under hydrogen flowing at the rate of 53 liters per hour at 600° F. Sulfur hexafluoride was thereafter introduced into the gaseous stream such that the hydrogen and sulfur hexafluoride flow rates respectively were 53 liters per hour and 12 liters per hour. After 2 hours at 600° F., contacting of the platinized alumina with sulfur hexafluoride was discontinued and hydrogen introduction was continued for 30 minutes. Upon analysis, the catalytically active material was found to contain 3.64 weight percent fluorine and 0.12 weight percent sulfur.

Example III

Into 175 cc. of concentrated ammonium hydroxide and 175 cc. of water, there was dissolved 3.75 grams of palladium chloride. The solution was mixed with 349 grams of a commercially available cracking catalyst composed of approximately 22 weight percent crystalline aluminosilicate zeolite Y in hydrogen form in admixture with silica and alumina in the ratio of 77:23 weight percent. After drying at 300° F., the resulting palladium-alumina composite was tabletted into 5/32 inch pellets.

125 cc. of the aforementioned 0.75 weight percent palladium-alumina composite were dried in an air stream at 800° F. for 3 hours. Hydrogen was permitted to pass through the composite at a temperature of 600° F. at the rate of 35 liters per hour for one hour. Thereafter 120 liters per hour of hydrogen and 35 liters per hour of sulfur hexafluoride were contacted with the composite for 2 hours at 600° F. Upon analysis, the final catalyst had a fluorine content of 2.79 weight percent and 0.15 weight percent sulfur.

The activity of the fluorided catalyst was compared to that of the unfluorided composite by employing each to hydrocrack light cycle gas oils to an API gravity of 52.0 employing conversion conditions of 4 LHSV, 1500 p.s.i.g. and 7500 s.c.f. $H_2$/bbl. The required activity employing the fluorided catalyst was obtained at 625° F. whereas the temperature had to be raised to 700° F. to maintain equivalent activity with the unfluorided composite.

Example IV 340 cc. of commercially available 0.47 weight percent platinum on eta-alumina were calcined at 800° F. for 3 hours under nitrogen. 252 grams of the calcined platinized eta-alumina were cooled to 600° F. and hydrogen was passed through the composite for one hour at the rate of 70 liters per hour. Sulfur hexafluoride was introduced along with hydrogen to the composite at the rate of 50 liters per hour of sulfur hexafluoride and 70 liters per hour of hydrogen for 2 hours at 600° F. Thereafter, hydrogen introduction was continued for one-half hour and upon analysis, the catalyst was found to contain 1.5 weight percent fluorine and 0.14 weight percent sulfur. A total of 255 grams of catalyst was recovered.

The catalyst was evaluated for wax hydroisomerization to reduce the pour point of a slack wax having an API gravity of 38.9 and a pour point of 0 under conversion conditions of 700° F., 500 p.s.i.g., 4310 s.c.f. $H_2$/bbl. and a slack wax flow of 1.96 LHSV. The converted product showed improved quality and had a pour point of −5 and an API gravity of 41.0.

Example V 130 cc. of commercially available calcined 0.47 percent platinum on eta-alumina was contacted with sulfur hexafluoride flowing through the composite bed at 700° F. at the rate of 10 liters per hour for one-half hour. Hydrogen was thereafter introduced at the rate of 40 liters per hour along with the fluoride compound at 700° F. After 2 hours, the catalyst was allowed to cool in a stream of hydrogen. Analysis showed that the catalyst contained 5.58 weight percent fluorine and less than 0.1 weight percent sulfur.

The catalyst was used to isomerize normal hexane at temperatures in the range of 400 to 700° F. Unit conditions were 300 p.s.i.g. of hydrogen flowing at 2 cubic feet per hour and a liquid charge of hexane of the rate of 100 cc. per hour. Product analysis showed that at a typical temperature of 600° F. normal hexane had been converted to 90.1 percent isomer with 62.1 percent as 3-methylpentane, 12.2 percent as 2-methylpentane and 2,3-dimethylpentane and 16.0 percent 2,2-dimethylpentane.

Example VI 106 grams of calcined platinum on eta-alumina as in Example IV was contacted with sulfur hexafluoride passing through the composite for one hour at the rate of 10 liters per hour at a temperature of 800° F. The composite was thereafter contacted wtih a mixed stream of sulfur hexafluoride and hydrogen introduced at the rates respectively of 10 liters per hour and 40 liters per hour at a temperature of 800° F. for 2 hours. While cooling hydrogen introduction was continued for 3 hours and 109 grams of catalyst were recovered which upon analysis contained 7.5 weight percent fluorine and 0.04 weight percent sulfur.

100 grams of catalyst was employed for n-hexane isomerization at 650° F., 300 p.s.i.g. hydrogen flowing at 2 cubic feet per hour and a hexane liquid hourly space velocity of 1.0. A total conversion of n-hexane to an isomeric form was 71.2 percent including 24.0 percent conversion to 3-methylpentane, 12.4 percent 2,2-dimethylbutane and 34.8 percent of a mixture of 2-methylpentane and 2,3-dimethylbutane.

From the foregoing, it can be seen that we have provided a significantly useful process for the preparation of a catalyst useful in the conversion of hydrocarbons. Our catalyst is particularly useful in the isomerization of isomerizable hydrocarbons especially paraffinic hydrocarbons in the $C_4$ to $C_6$ range. Our catalyst can also be used in alkylation processes without varying the manipulative procedures to accommodate the catalyst prepared by our invention. It is seen that our process can be performed in situ, i.e., within the hydrocarbon conversion reactor itself and does not necessitate withdrawal of catalyst from the vessel for transfer to the hydrocarbon conversion reactor with the attendant problem of subjecting the catalyst to moisture. It should be further noted that our process can be performed to regenerate a spent catalyst by first heating the spent catalyst to decarbonize the catalyst and then treating in the manner of our invention. Our process can be performed without the use of expensive chemicals, high pressures or temperatures and is thus suited for commercial operation. Our catalyst can contain any one of the aforementioned metals, for example, platinum, palladium, ruthenium and rhodium depending upon the choice of the particular operator, the availability of the metal etc. The activation of the catalyst bases containing any of these metals proceeds essentially in the same way of activation of alumina base catalyst containing another metal of the group. Thus the manipulative procedure does not substantially vary from one metal to the other.

The terms and expressions which have been used herein are terms of description and not of limitation as there is no intention in the use of such terms and expressions of excluding any equivalents of the features shown and described or portions thereof as it is recognized that various modifications are possible within the scope of the invention. In addition to the specific naphthenic and paraffinic hydrocarbons, other hydrocarbons can be isomerized and our process can be used in other hydrocarbon conversion processes.

We claim:

1. A method of preparing a catalyst comprising a hydrogenating component, alumina and from about 0.5 to 15.0 weight percent fluorine which comprises contacting alumina having associated therewith a hydrogenating component selected from the group consisting of the metals, oxides, sulfides and salts of the metals of Groups VI–B, VII–B and VIII of the Periodic Table and mixtures thereof with a combination of hydrogen and sulfur hexafluoride at a temperature of from about 200 to 1200° F.

2. A method according to claim 1 wherein said hydrogenating component is present in said catalyst in an amount of from 0.01 to 30.0 weight percent calculated as weight of metal.

3. A method according to claim 1 wherein said component is selected from the group consisting of platinum, palladium, ruthenium, rhodium, nickel, rhenium, cobalt, molybdenum, chromium and tungsten.

4. A method according to claim 1 wherein said component is selected from the group consisting of platinum, palladium, rhodium and ruthenium and where said component is present in said catalyst in an amount of from 0.1 to 2.0 weight percent.

5. A method according to claim 1 wherein said component comprises platinum and rhenium.

6. A method according to claim 1 wherein the mole ratio of said hydrogen to said sulfur hexafluoride is from 0.1:1 to 100:1.

7. A method according to claim 1 wherein the mole ratio of said hydrogen to said sulfur hexafluoride is from 2:1 to 10:1.

8. A method according to claim 1 wherein said temperature is from 600 to 900° F.

9. A method according to claim 1 wherein said fluorine is present in an amount of from 0.5 to 6.0 weight percent.

10. A method according to claim 1 wherein said alumina is eta-alumina.

11. A method according to claim 1 wherein said alumina is gamma-alumina.

12. A method according to claim 1 wherein said alumina is an aluminosilicate.

13. A method according to claim 1 wherein said alumina is silica-alumina.

14. A method according to claim 1 wherein said alumina has a surface area of from 50 to 400 square meters per gram.

References Cited
UNITED STATES PATENTS

| | | | |
|---|---|---|---|
| 3,444,096 | 5/1969 | Turner et al. | 252—439 X |
| 3,322,689 | 5/1967 | Giannetti et al. | 252—439 X |
| 3,338,843 | 8/1967 | Goble et al. | 252—442 |
| 3,449,237 | 6/1969 | Jacobson et al. | 252—466 PT X |
| 3,558,523 | 1/1971 | Rausch | 252—439 |
| 3,576,766 | 4/1971 | Rausch | 252—439 |

PATRICK P. GARVIN, Primary Examiner

U.S. Cl. X.R.

252—441, 442; 260—683.75, 683.53; 208—111, 112